United States Patent [19]

Haring

[11] Patent Number: 4,927,652

[45] Date of Patent: May 22, 1990

[54] PROCESS FOR THE EXTRACTION OF LACTONES FROM LIPID MATERIAL

[75] Inventor: Petrus G. M. Haring, Vlaardingen, Netherlands

[73] Assignee: Lever Brothers Company, New York, N.Y.

[21] Appl. No.: 283,701

[22] Filed: Dec. 13, 1988

[30] Foreign Application Priority Data

Dec. 16, 1987 [EP] European Pat. Off. ............ 87202559

[51] Int. Cl.$^5$ .............................................. A23D 5/00
[52] U.S. Cl. .................................. 426/330.6; 426/536
[58] Field of Search ............... 426/603, 613, 534, 536, 426/330.6

[56] References Cited

U.S. PATENT DOCUMENTS 4,504,503  3/1985  Biernoth .............................. 426/312

FOREIGN PATENT DOCUMENTS

| 578288 | 6/1959 | Canada ................................... 426/603 |
| 586782 | 11/1959 | Canada ................................... 426/603 |
| 0074145 | 3/1983 | European Pat. Off. . |
| 56-22722 | 3/1981 | Japan .................................... 426/534 |
| 58-146252 | 8/1983 | Japan .................................... 426/603 |
| 62-134042 | 6/1987 | Japan . |

OTHER PUBLICATIONS

Arul 1987, Fractionation of Anhydrous Milk Fat by Superficial Carbon Dioxide J. Food Science 52(5) 1231.

*Primary Examiner*—Carolyn Paden
*Attorney, Agent, or Firm*—Matthew J. McDonald

[57] ABSTRACT

The present invention is concerned with a process for the extraction of lactones from a lactone-containing lipid material, by contracting a medium, having a temperature near the critical temperature of the medium, and having a pressure near the critical pressure of the medium, with the lipid material, and subsequently removing the medium, wherein the medium, upon contacting, has a temperature T (in °C.), and pressure P (in bar), such that:

$$-25 <= T^* <= 18.5$$

$$-40 <= P^* <= 300$$

$$T^* \times P^* <= 1900$$

where $T^* = T - T_c$, $P^* = P - P_c$, $T_c$ is the critical temperature (in °C.), and $P_c$ is the critical pressure (in bar) of the medium. Under the extraction conditions as applied in the process according to the present invention a low yield, combined with a high selectivity is obtained, resulting in a relatively small extracted fraction, which is substantially enriched in lactones.

10 Claims, 1 Drawing Sheet

PROCESS FOR THE EXTRACTION OF LACTONES FROM LIPID MATERIAL

BACKGROUND OF THE INVENTION

The present invention relates to a process for the extraction of lactones from a lactone-containing lipid material, by contacting a medium, having a temperature near the critical temperature of said medium, and having a pressure near the critical pressure of said medium, with the lipid material, and subsequently removing the medium.

The above process is known from European patent application no. 82201077.3 (Unilever) In said application the fractionation of butterfat, by means of supercritical carbon dioxide, is disclosed. It is also mentioned that the extracted fraction was enriched in lactones. The extraction was carried out by means of supercritical carbon dioxide at a pressure of 200 bar and a temperature of 80° C. The lactone-enriched fraction obtained constituted about 19 wt. % of the original product.

Japanese application 62/134042, describes a method of preparing butterfat of low cholesterol content, by extracting butterfat with supercritical carbondioxide, at a temperature of 40° C. and pressures of 300-350 kg/cm² (294.3-333.4 bar), and subsequently contacting the extracted butterfat with a silicic acid column.

In Journal of Food Science, 52 (1987), 1231 the fractionation of milkfat with supercritical carbondioxide at temperatures of 50° C. and 70° C., over a pressure range of 100-350 bar, is mentioned.

BRIEF SUMMARY OF THE INVENTION

It has been found now that a fraction, containing a substantially increased amount of lactones may be obtained by contacting a lactone-containing lipid material with a medium, having a relatively low pressure and/or temperature.

The present invention therefore is concerned with a process for the extraction of lactones from a lactone-containing lipid material, by contacting a medium, having a temperature near the critical temperature of said medium, and having a pressure near the critical pressure of said medium, with the lipid material, and subsequently removing the medium, wherein the medium, upon contacting, has a temperature T (in °C.), and pressure P (in bar), such that:

$$-25 \leq T^* \leq 18.5$$

$$-40 \leq P^* \leq 300$$

$$T^* \times P^* \leq 1900$$

where $T^* = T - T_c$, $P^* = P - P_c$, $T_c$ is the critical temperature (in °C.), and $P_c$ is the critical pressure (in bar) of said medium. Here "x" represents the multiplication operator, and "$\leq$" is the same as "equal to or less than".

DETAILED DESCRIPTION OF INVENTION

Figure 1:
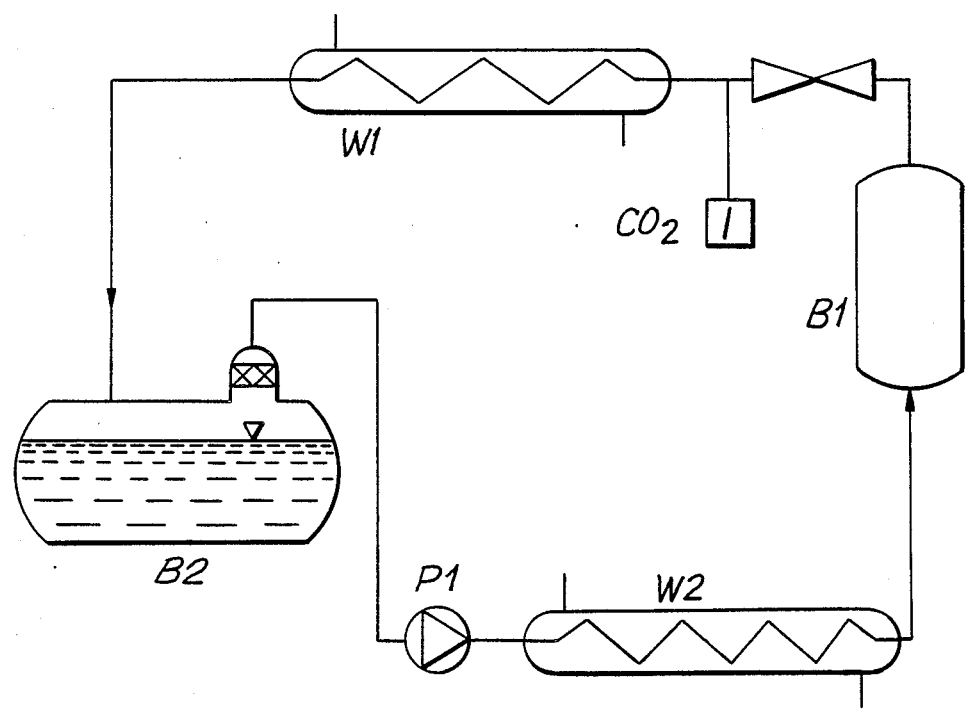

Under the extraction conditions as employed in the process according to the present invention, a low yield, combined with a high selectivity is obtained, resulting in a relatively small extracted fraction, which is substantially enriched in lactones. Under the applied conditions the extraction medium may be either liquid, gaseous or in the supercritical state. Preferably, however the extraction medium, when contacted with the lipid material, is either liquid or in the supercritical state.

Very good results are obtained by the present process if $T^* \times P^* \leq 1500$. In a preferred embodiment of the present process conditions are chosen such that: $T^* \times P^* \leq 1000$.

Furthermore, preferably, the temperature T of the medium upon contacting should be such that: $T^* \leq 14$. More preferably the temperature T is chosen such that: $T^* \leq 8.5$. An advantage of extracting at such relatively low temperatures is that oxidation of butterfat-components is minimized. Also the pressure applied, preferably is rather low, i.e. $P^* \leq 200$.

In general a temperature substantially below the supercritical temperature should be combined with not too low a pressure. Therefore, in the present process, preferably, conditions are chosen such that: $(T^* + 30) \times (P^* + 75) \geq 1000$. Here "$\geq$" is the same as "at least".

By lipid material is to be understood the whole group compositions in which the higher fatty acids, i.e. C10 and higher, are present as essential components. Examples of lipid materials are compositions containing substantial amounts of mono-, di- and/or triglycerides, free fatty acids, and/or phosphatides. Preferably the lipid material comprises at least 50 wt. %, more preferably at least 80 wt. %, of mono-, di- and/or triglycerides, free fatty acids, and/or phosphatides.

Very good results are obtained if the present process is used to extract lactones from dairy products, such as butter, butter oil, and cream, or from the group of lauric fats, consisting of coconut oil, palmkernel oil and babassu oil, or from so called "acid oils" of lauric fats, which acid oils are the distillates obtained when oils are subjected to a distillative deacidification. Such an acid oil mainly consists of free fatty acids, but, in case of lauric fats, it also comprises an amount of lactones which is considerably higher than the lactone-content in the original oil. The lauric fats applied in the present process have preferably been refined to such an extent that substantially no solid vegetable residue-material is present therein.

The dairy products which may be subjected to the present extraction process preferably comprise at least 40 wt. %, more preferably at least 70 wt. %, of dairy fat. Most preferred however are butter oil and fractions thereof.

The present process is particularly useful for extracting lipid materials mainly consisting of triglycerides, such as dairy fats and vegetable oils, or fractions thereof. In this application the words fat and oil are regarded to be synonymous and are used interchangeably.

The benefits of the process of the present invention especially appreciated if the lipid material to be extracted comprises at least 0.001 wt. %, more preferably at least 0.003 wt. % of lactones. The group of lactone-compounds as referred to in this application, consists of gamma- and delta-lactones, i.e. 4- and 5-alkanolides and 4- and 5-alkenolides, with a side-chain of 1-14 carbon atoms, these side chains can be either saturated or unsaturated. Lactones are already well known for their pleasant flavour, and are used, for example, in butter flavour compositions. The lipid material used in the present process preferably contains at least 0.003 wt. % of $C_{10}$ and/or $C_{12}$ lactone.

In general the separation factor obtained in the present process for the combination of $C_{10}$ and $C_{12}$ lactones is at least 5. Here the separation factor for the $C_{10}$ and $C_{12}$ lactones ($SF_{10-12}$) is calculated as follows:

$$SF_{10-12} = C_E / \tfrac{1}{2}\times(C_F+C_R)$$

where: $C_E$ is the $C_{10}+C_{12}$ lactone-content of the extract, $C_F$ is the $C_{10}+C_{12}$ lactone-content of the feed and $C_R$ is the $C_{10}+C_{12}$ lactone-content of the residue.

The above contents are determined after all the extraction medium has been removed from the material to be analyzed. Preferably the separation factor for the combination of $C_{10}$ and $C_{12}$ lactones, obtained in the present process is at least 6, more preferably at least 8.

As under the conditions applied in the present process the solubility of lipids in the medium is rather low, the extract, obtained after the removal of the medium, is usually obtained in an amount, which constitutes less than 12 wt. % of the original amount of lipid material, before extraction. As a concentrate having a relatively high lactone-content is often desired, the extract as obtained after removal of the medium preferably constitutes less than 8 wt. %, more preferably even less than 4 wt. %, of the original amount of lipid material. An important advantage of extracting only a small part of the feed is that the remaining residue does not differ very much in composition from the original starting material, although of course the lactone-flavour of the residue is substantially reduced. Therefore the residue may be applied instead of the original starting material in many applications where the flavour of the material is not important, or even undesired, such as for instance in case of lauric fats and acid oils. In fact the present process may be used to partly deodorise lauric fats, resulting in a lauric fat having a substantially reduced off-flavour, and a valuable concentrate having a high lactone-content.

If the present process is used to extract lactones from butter or butter oil, the residue obtained may be used in for example bakery products as the difference in properties between the residue and the original butter or butter oil, in such products, is barely perceptible as through baking the flavour-contribution of the residue will be increased. Moreover, due to the fact that the triglyceride composition of the residue is not very different from the triglyceride composition of the original butter or butter oil, said residue may successfully replace butter or butter oil in products which comprise butter fat as a structuring fat.

In a preferred embodiment of the process according to the present invention, before contacting the lipid material with the medium, the oxygen-content of the lipid material is substantially reduced, as the presence of oxygen, under the conditions applied, may lead to oxidation of the lipid material, thereby adversely affecting the quality of the extract obtained. The oxidation of the lipid material may, for example, result in the formation of off-flavours, which may have a negative influence on the flavour-quality of the extract obtained.

The oxygen-content of the lipid material may be reduced by, for example, subjecting it to low pressure, or by replacing the oxygen with another, preferably inert, gas, prior to extraction.

The extracts obtained by the process according to the present invention are especially suited for application as flavour-concentrates in foodstuffs. If butter, butterfat, or a fraction thereof is applied as the lipid material, in the extract obtained, almost the complete butter flavour is concentrated. Therefore said concentrate may be used to render food products, such as for example spreads, an excellent butter flavour. The concentrates obtained according to the present process offer the advantage that they may be used to give a food product a butter flavour, without the inevitable addition of a large amount of high-caloric fat, as is the case when butter or butter oil is added for flavouring purposes. Thus the concentrates obtained via the present process make it possible to prepare a low fat spread, having an excellent natural butter flavour. Compared with artificial flavour-compositions which also do not contain large amounts of fat, the concentrates obtained via the present process have a more balanced, more butterlike, flavour.

The medium used in the present process to extract the lactones from the lipid material preferably comprises one or more of the following gasses: nitrogen, $SF_6$, $CH_3F$, $CHF_3$, $CHF_2Cl$, $CF_3Cl$, $CF_2=CH_2$, $C_3F_8$, $N_2O$, acetylene, ethane, propane, ethylene, propylene or carbon dioxide. More preferably the medium comprises ethane, propane, carbon dioxide, or mixtures thereof. Best results, however, are obtained when a medium mainly consisting of carbon dioxide is used as extraction-medium. Preferably the extraction medium comprises at least 80 wt. % of carbon dioxide.

In a preferred embodiment of the present process carbon dioxide, having a critical point at 31.1° C. and 73.8 bar, when contacted with the lipid material, has a temperature below 39° C., and a pressure between 63 and 200 bar, as under such conditions an extract, comprising a relatively high level of lactones may be obtained.

In yet another preferred embodiment of the present invention the process is repeated, using the extract, obtained after the removal of the medium, as the lipid material, to be extracted. Thus even from lipid materials, comprising low levels of lactones, an extract may be obtained having a high lactone-content. Moreover this embodiment also enables the preparation of concentrates containing extreme high levels of lactones. For example a butter flavour concentrate may be obtained by repeatedly extracting the extracts obtained, using the present process, which has a butter flavour which is 25 times as strong as the flavour of normal butter.

The invention also encompasses the use of entrainers to improve the separation factor obtained in the present process.

Another embodiment of the present invention concerns the use of an extract obtained by the process according to the present invention for flavouring foodstuffs. Preferably the extracts obtained by the present process are used for flavouring spreads such as margarines and halvarines. More preferably said extracts are used for flavouring low fat spreads, i.e. spreads having a fat-content of less than 70 wt. %, preferably less than 45 wt. %.

The invention is further illustrated by the following Examples.

EXAMPLE 1

2000 g of (winter) butteroleine (ex N. Corman et Fils S.A., Göe Dolhain, Belgium) was kept for two hours under 100 bar nitrogen-pressure, after which it was extracted by means of supercritical carbon dioxide, employing an apparatus as illustrated in the accompanying drawing (FIG. 1), wherein:

$B_1$ represents a 4 liter extraction vessel
$B_2$ represents a 2 liter separation vessel
$P_1$ represents a compressor
$W_1$ represents a first heat exchanger
$W_2$ represents a second heat exchanger
The extraction conditions applied were as follows:
Pressure: 175 bar
Temperature: 50° C.
Extraction time: 1 hour
Flow rate of carbon dioxide: 1.2 kg/hour
The separation conditions applied were as follows:
Pressure: 50 bar
Temperature: 20° C.

Under the above conditions 14.4 g of extract was extracted from the feed (starting material). Analysis of the extract, feed and residue yielded the following results:

|  | Extract | Feed | Residue |
| --- | --- | --- | --- |
| P.O.V.* | — | 0.7 | 1.06 |
| Anisidine Value** | — | 0.7 | 0.4 |
| Iodine Value | — | 32.2 | 34.2 |
| $C_8$ lactone (ppm) | 7 | 0.6 | 0.6 |
| $C_{10}$ lactone (ppm) | 106.2 | 11.9 | 8.8 |
| $C_{12}$ lactone (ppm) | 193.8 | 22.5 | 19.6 |
| $C_{14}$ lactone (ppm) | 252.2 | 30.2 | 25.2 |

*The way to determine the peroxide value (mmol $O_2$/2kg fat) is described by P. G. Powick, J. Agric. Res., 26, (1923), 323.
**The anisidine value may be determined by using the method described in IUPAC, Standard Methods for Analysis of Oils, Fats and Derivatives, 6th ed. (1979), Pergamon Press, Oxford, Method 2504, page 143.

Thus the separation factor found for the combination of $C_{10}+C_{12}$ lactones was $300/(0.533\,(28.4+34.4))=9.6$.

The extract, when incorporated in a conventional margarine, at a concentration-level of 10 wt. %, had a very pronounced taste and virtually no off-flavour could be detected.

EXAMPLE 2

Example 1 was repeated with the exception that the butter olein used was summer butter olein (ex Corman et Fils S.A., Belgium) and the extraction temperature employed was 38° C. instead of 50° C. Under these extraction conditions 33.1 g of extract were obtained.

Analysis of the extract, feed and residue gave the following results:

|  | Extract | Feed | Residue |
| --- | --- | --- | --- |
| P.O.V. | 0.19 | 0.2 | 0.24 |
| Anisidine Value | 0.0 | 0.1 | 0.0 |
| Iodine Value | 34.6 | 39.5 | 41.4 |
| $C_8$ lactone (ppm) | 6.95 | 2.7 | 0.1 |
| $C_{10}$ lactone (ppm) | 80.2 | 6.4 | 4.5 |
| $C_{12}$ lactone (ppm) | 131.6 | 14.2 | 12.3 |
| $C_{14}$ lactone (ppm) | 148.1 | 11.1 | 10.6 |

Thus the extraction yielded a separation factor of 11.3 for the combination of $C_{10}$ and $C_{12}$ lactones.

EXAMPLE 3

2000 g of butter oil was extracted with supercritical carbondioxide, at a pressure of 200 bar and a temperature of 40° C., using the apparatus described in Example 1. The extraction was continued for 8 hours. Each hour the weight of the feed (in grams) and the $C_{10}$ and $C_{12}$ lactone concentrations (in ppm) of the feed were determined. The feed after 1 hour is in fact the residue obtained after 1 hour extraction. Also each hour the extract obtained in that hour was removed and separately analyzed to determine its weight (in grams) and its lactone concentration (in ppm). The separation factors represented below relate to individual lactones and were obtained using the earlier described formula.

The results obtained were as follows:

| | $C_{10}$ LACTONE | | | | |
| --- | --- | --- | --- | --- | --- |
| Hours | Weight Feed | Conc. Feed | Weight Extract | Conc. Extract | Separation Factor |
| 1 | 2000 | 8.5 | 89 | 21.3 | 2.6 |
| 2 | 1911 | 7.9 | 99 | 38.8 | 5.5 |
| 3 | 1812 | 6.2 | 65 | 35.8 | 6.3 |
| 4 | 1747 | 5.1 | 88 | 31.0 | 7.0 |
| 5 | 1659 | 3.7 | 72 | 20.7 | 6.2 |
| 6 | 1587 | 3.0 | 17 | 31.1 | 11.0 |
| 7 | 1570 | 2.7 | 17 | 28.2 | 11.2 |
| 8 | 1553 | 2.4 | 37 | 30.2 | 14.7 |

$C_{10}$ lactone concentration in residue (1516 g) was 1.7 ppm. Thus the separation factor for the 8 hour extraction is 5.8.

| | $C_{12}$ LACTONE | | | | |
| --- | --- | --- | --- | --- | --- |
| Hours | Weight Feed | Conc. Feed | Weight Extract | Conc. Extract | Separation Factor |
| 1 | 2000 | 19.4 | 89 | 46.3 | 2.5 |
| 2 | 1911 | 18.2 | 99 | 67.7 | 4.0 |
| 3 | 1812 | 15.4 | 65 | 73.6 | 5.1 |
| 4 | 1747 | 13.3 | 88 | 69.5 | 5.9 |
| 5 | 1659 | 10.3 | 72 | 49.5 | 5.3 |
| 6 | 1587 | 8.5 | 17 | 72.2 | 8.8 |
| 7 | 1570 | 7.8 | 17 | 60.9 | 8.1 |
| 8 | 1553 | 7.2 | 37 | 62.3 | 9.5 |

$C_{12}$ lactone concentration in residue was 5.9 ppm. The separation factor for the 8 hour extraction is 4.9.

EXAMPLE 4

Example 3 was repeated with the exception that the extraction temperature was 25° C. and that the extraction was continued for 5 hours.

| | $C_{10}$ LACTONE | | | | |
| --- | --- | --- | --- | --- | --- |
| Hours | Weight Feed | Conc. Feed | Weight Extract | Conc. Extract | Separation Factor |
| 1 | 2000 | 8.5 | 111 | 59.8 | 8.6 |
| 2 | 1889 | 5.5 | 114 | 32.4 | 7.0 |
| 3 | 1775 | 3.8 | 92 | 28.3 | 9.2 |
| 4 | 1683 | 2.4 | 124 | 11.3 | 5.5 |
| 5 | 1559 | 1.7 | 97 | 10.3 | 7.2 |

$C_{10}$ lactone concentration in the residue (1462 g) was 1.1 ppm. The separation factor for the 5 hour extraction is 5.9.

| | $C_{12}$ LACTONE | | | | |
| --- | --- | --- | --- | --- | --- |
| Hours | Weight Feed | Conc. Feed | Weight Extract | Conc. Extract | Separation Factor |
| 1 | 2000 | 19.4 | 111 | 111.0 | 6.6 |
| 2 | 1889 | 14.0 | 114 | 70.8 | 5.8 |
| 3 | 1775 | 10.4 | 92 | 54.5 | 5.9 |
| 4 | 1683 | 8.0 | 124 | 24.4 | 3.3 |
| 5 | 1559 | 6.7 | 97 | 22.0 | 3.6 |

$C_{12}$ lactone concentration in the residue was 5.6 ppm. The separation factor for the 5 hour extraction is 4.5.

EXAMPLE 5

Example 4 was repeated with the exception that the extraction was carried out at a pressure of 70 bar and was continued for 7 hours. The following results were obtained:

| | $C_{10}$ LACTONE | | | | |
|---|---|---|---|---|---|
| Hours | Weight Feed | Conc. Feed | Weight Extract | Conc. Extract | Separation Factor |
| 1 | 2000 | 8.5 | 14 | 54.8 | 6.6 |
| 2 | 1986 | 8.2 | 14 | 60.1 | 7.5 |
| 3 | 1972 | 7.8 | 15 | 60.9 | 8.0 |
| 4 | 1957 | 7.4 | 18 | 59.1 | 8.3 |
| 5 | 1939 | 6.9 | 15 | 68.3 | 10.2 |
| 6 | 1924 | 6.4 | 11 | 42.2 | 6.7 |
| 7 | 1913 | 6.2 | 8 | 36.5 | 5.9 |

$C_{10}$ lactone concentration in residue (1905 g) was 6.1 ppm. The separation factor for the 7 hour extraction is 7.7.

| | $C_{12}$ LACTONE | | | | |
|---|---|---|---|---|---|
| Hours | Weight Feed | Conc. Feed | Weight Extract | Conc. Extract | Separation Factor |
| 1 | 2000 | 19.4 | 14 | 103.4 | 5.4 |
| 2 | 1986 | 18.8 | 14 | 124.6 | 6.8 |
| 3 | 1972 | 18.1 | 15 | 131.1 | 7.4 |
| 4 | 1957 | 17.2 | 18 | 124.6 | 7.5 |
| 5 | 1939 | 16.2 | 15 | 152.0 | 9.7 |
| 6 | 1924 | 15.1 | 11 | 90.0 | 6.0 |
| 7 | 1913 | 14.7 | 8 | 88.0 | 6.1 |

$C_{12}$ lactone concentration in the residue was 14.4 ppm. The separation factor for the 7 hour extraction is 7.1.

EXAMPLE 6

Example 4 was repeated except that the extraction temperature was 20° C. and the extraction pressure 60 bar. The results obtained are represented below.

| | $C_{10}$ LACTONE | | | | |
|---|---|---|---|---|---|
| Hours | Weight Feed | Conc. Feed | Weight Extract | Conc. Extract | Separation Factor |
| 1 | 2000 | 8.5 | 8.3 | 56.5 | 6.7 |
| 2 | 1992 | 8.3 | 10.0 | 42.5 | 5.2 |
| 3 | 1982 | 8.1 | 11.4 | 43.0 | 5.4 |
| 4 | 1970 | 7.9 | 14.1 | 54.0 | 7.0 |
| 5 | 1956 | 7.6 | 21.0 | 55.7 | 7.6 |

$C_{10}$ lactone concentration in the residue (1935 g) was 7.1 ppm. The separation factor for the 5 hour extraction is 6.5.

| | $C_{12}$ LACTONE | | | | |
|---|---|---|---|---|---|
| Hours | Weight Feed | Conc. Feed | Weight Extract | Conc. Extract | Separation Factor |
| 1 | 2000 | 19.4 | 8.3 | 107.2 | 5.6 |
| 2 | 1992 | 19.0 | 10.0 | 75.5 | 4.0 |
| 3 | 1982 | 18.8 | 11.4 | 85.4 | 4.6 |
| 4 | 1970 | 18.4 | 14.1 | 112.6 | 6.3 |
| 5 | 1956 | 17.7 | 21.0 | 126.3 | 7.4 |

$C_{12}$ lactone concentration in reside was 16.5 ppm. The separation factor for the 5 hour extraction is 5.9.

I claim:

1. Process for the extraction of lactones from a lactone-containing lipid material, by contacting a medium, having a temperature near the critical temperature of said medium, and having a pressure near the critical pressure of said medium, with the lipid material, and subsequently removing the medium, wherein the medium, upon contacting, has a temperature T (in °C.), and pressure P (in bar), such that:

$$-25 \leq T^* \leq 18.5$$

$$-40 \leq P^* \leq 300$$

$$T^* \times P^* \leq 1900$$

where $T^* = T - T_c$, $P^* = P - P_c$, $T_c$ is the critical temperature (in °C.), and $P_c$ is the critical pressure (in bar) of said medium.

2. Process according to claim 1, wherein:

$$T^* \times P^* \leq 1000.$$

3. Process according to claim 1, wherein:

$$(T^* + 30) \times (P^* + 75) \geq 1000.$$

4. Process according to claim 1, wherein the lipid material, before contacting, comprises at least 0.001 wt. % of lactones.

5. Process according to claim 1, wherein a separation factor of at least 5 is obtained for the combination of $C_{10}$ and $C_{12}$ lactones.

6. Process according to claim 1, wherein the extract, obtained after the removal of the medium, constitutes less than 12 wt. % of the original amount of lipid material, before extraction.

7. Process according to claim 1, wherein, before contacting the lipid material with the medium, the oxygen-content of the lipid material is substantially reduced.

8. Process according to claims 1, wherein the lipid material comprises a dairy product, a lauric fat or an acid oil of a lauric fat.

9. Process according to claim 8, wherein the lipid material comprises butterfat or a fraction thereof.

10. Process according to claim 1, wherein the medium mainly consists of carbon dioxide.

* * * * *